United States Patent
Uehara (10) Patent No.: US 7,969,999 B2
(45) Date of Patent: Jun. 28, 2011

(54) SIGNAL PACKET RELAY DEVICE

(75) Inventor: Teruaki Uehara, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 136 days.

(21) Appl. No.: 12/405,263

(22) Filed: Mar. 17, 2009

(65) Prior Publication Data

US 2009/0245271 A1    Oct. 1, 2009

(30) Foreign Application Priority Data

Mar. 26, 2008    (JP) ................................. 2008-080370

(51) Int. Cl.
*H04L 12/28* (2006.01)
(52) U.S. Cl. ...................................... 370/412
(58) Field of Classification Search .......................... None
See application file for complete search history.

(56) References Cited

U.S. PATENT DOCUMENTS

| | | | | |
|---|---|---|---|---|
| 6,356,951 B1* | 3/2002 | Gentry, Jr. | ................... | 709/250 |
| 6,453,360 B1* | 9/2002 | Muller et al. | ................ | 709/250 |
| 6,480,489 B1* | 11/2002 | Muller et al. | ................ | 370/389 |
| 6,483,804 B1* | 11/2002 | Muller et al. | ................ | 370/230 |
| 6,606,301 B1* | 8/2003 | Muller et al. | ................ | 370/230 |
| 6,650,640 B1* | 11/2003 | Muller et al. | ................ | 370/392 |
| 7,554,907 B1* | 6/2009 | Epps et al. | ................ | 370/230 |
| 2004/0125815 A1* | 7/2004 | Shimazu et al. | ............. | 370/411 |
| 2006/0050690 A1* | 3/2006 | Epps et al. | .................... | 370/359 |

FOREIGN PATENT DOCUMENTS

JP    2005-094392    4/2005

* cited by examiner

*Primary Examiner* — Ayaz R Sheikh
*Assistant Examiner* — Faiyazkhan Ghafoerkhan
(74) *Attorney, Agent, or Firm* — Volentine & Whitt, PLLC (57) ABSTRACT

A packet-signaling relay device selectively relays incoming signal packets, and includes a random number generation unit which generates a random number, a delete threshold generation unit which generates a delete threshold based on an objective delete probability, a comparison unit which compares the random number and the delete threshold to generate a comparison result, and a delete determination unit which generates a delete/storage determination result based on the comparison result. The packet-signaling relay device further includes a packet receiving-and-storing unit which is responsive to the comparison result to selectively delete or store incoming signal packets, and a sending unit for sending the signal packets stored in the packet receiving-and-storing unit.

10 Claims, 9 Drawing Sheets

SIGNAL PACKET RELAY DEVICE

BACKGROUND OF THE INVENTION

1. Field of the Invention

The present invention generally relates to communication networks, and more particularly, the present invention relates to a signal packet relay device which receives and transmits data packets in a communications network.

A claim of priority is made to Japanese patent application number 2008-080370, filed Mar. 26, 2008, the disclosure of which is incorporated herein by reference.

2. Description of the Related Art

Weighted Random Early Detection (WRED) is a queue management system utilized to reduce the number of re-sent signal packets on communications networks such as the internet, thereby reducing traffic congestion on the network. According to WRED, a minimum delete threshold and a maximum delete threshold are established in advance. So long as the number of stored signal packets in the queue at any given time is less than the minimum delete threshold, all received and stored signal packets are maintained. However, if the number of stored signal packets exceeds the minimum delete threshold, incoming signal packets may be deleted (dropped) according a delete probability (drop probability) which corresponds to the number of the signal packets stored in the queue. If the number of stored packets exceeds the maximum delete threshold, all incoming signal packets are deleted.

Figure 12:
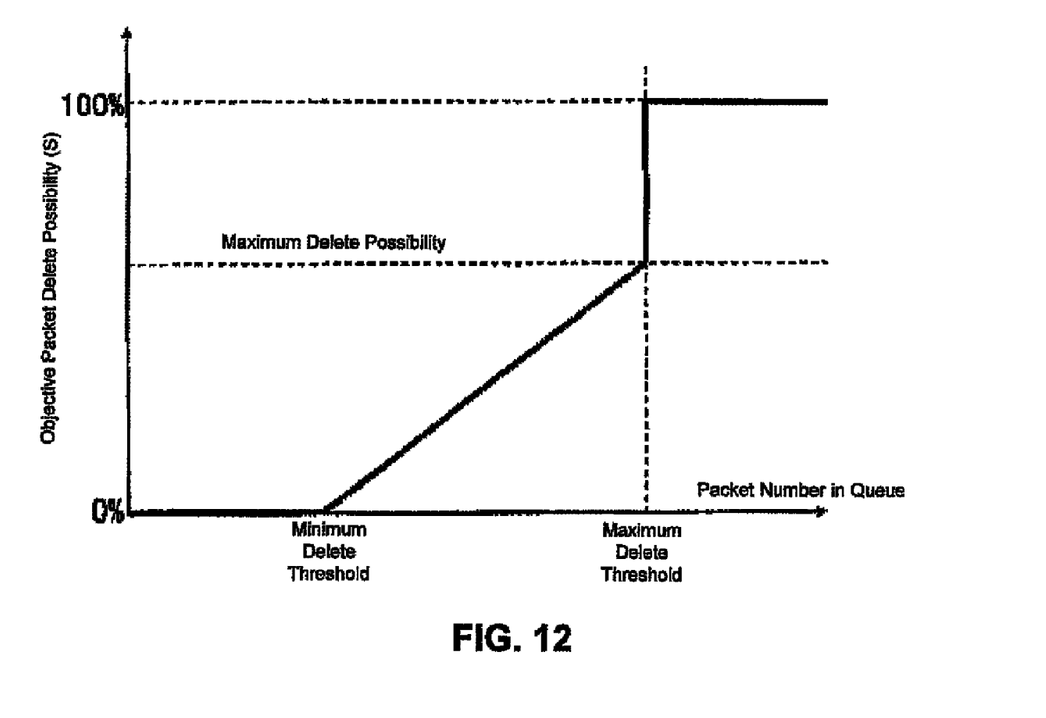
FIG. 12 shows packet delete probabilities based on a conventional WRED method.

FIG. 12 graphically illustrates WRED packet delete probabilities. As shown, delete probability is zero so long as the number of the signal packets stored in the queue is less than the minimum delete threshold. Then, in this example, the delete probability increases linearly between the minimum delete probability and the maximum delete probability. If the number of signal packets stored in the queue exceeds the maximum delete probability, then the delete probability of incoming signal packets becomes 100 percent (i.e., all incoming signal packets are deleted).

In an effort to increase operational speeds relative to devices relying partially on software executions, Japanese Patent Application Laid-Open Publication No. 2005-94392, describes a hardware-implemented packet processing device for avoiding congestion of communication network traffic by signal packet deletion. This document acknowledges that an ideal delete probability K1 between a minimum delete threshold to a maximum delete threshold is substantially linear. However, the signal packet processing device proposed by the document describes a non-linear implementation in which the section between the minimum delete threshold and the maximum delete threshold is divided into multiple step-increased subsections, where each of the subsection has a constant delete probability. This non-linear increase in delete probability can adversely impact characteristics of the WRED implementation.

SUMMARY OF THE INVENTION

According to an aspect of the present invention, packet-signaling relay device selectively relays incoming signal packets, and includes a random number generation unit which generates a random number, a delete threshold generation unit which generates a delete threshold based on an objective delete probability, a comparison unit which compares the random number and the delete threshold to generate a comparison result, and a delete determination unit which generates a delete/storage determination result based on the comparison result. The packet-signaling relay device further includes a packet receiving-and-storing unit which is responsive to the comparison result to selectively delete or store incoming signal packets, and a sending unit for sending the signal packets stored in the packet receiving-and-storing unit.

BRIEF DESCRIPTION OF THE DRAWINGS

The above and other aspects and features of the present invention will become readily apparent from the following detailed description that follows, with reference to the accompanying drawings, in which.

DETAILED DESCRIPTION OF EMBODIMENTS

The present invention will be described below by way of preferred, but non-limiting, embodiments of the invention. The embodiments presented herein are considered examples of various implementations of the invention, and are not intended to limit or specifically define the overall scope of the invention.

For ease of understanding and to avoid redundancy, like reference numbers refer to the same or similar elements throughout the drawings. Also, while the drawings contain a number of circuit elements, it will be understood from the nature of electrical circuits that when an element is described as being connected to another element, it can be directly connected the other element or one or more intervening elements may be present. In contrast, if an element is referred to as being "directly connected to" another element, then no intervening elements are present. Other words used to describe the relationship between elements should be interpreted in a like fashion (e.g., "between" versus "directly between," "adjacent" versus "directly adjacent," "connected" versus "directly connected," etc.).

As is traditional in the field of the present invention, embodiments of the invention may be described at least partially in terms of functional blocks or units. It will be readily understood that the functional blocks or units denote electronic circuits which are configured (e.g., by dedicated and/or programmable electronic circuitry) to execute the signaling and/or computational operations described herein. Also, it will be readily understood that one or more functional blocks may be physically combined into complex circuitry without departing from the spirit and scope of the present invention.

Figure 1:
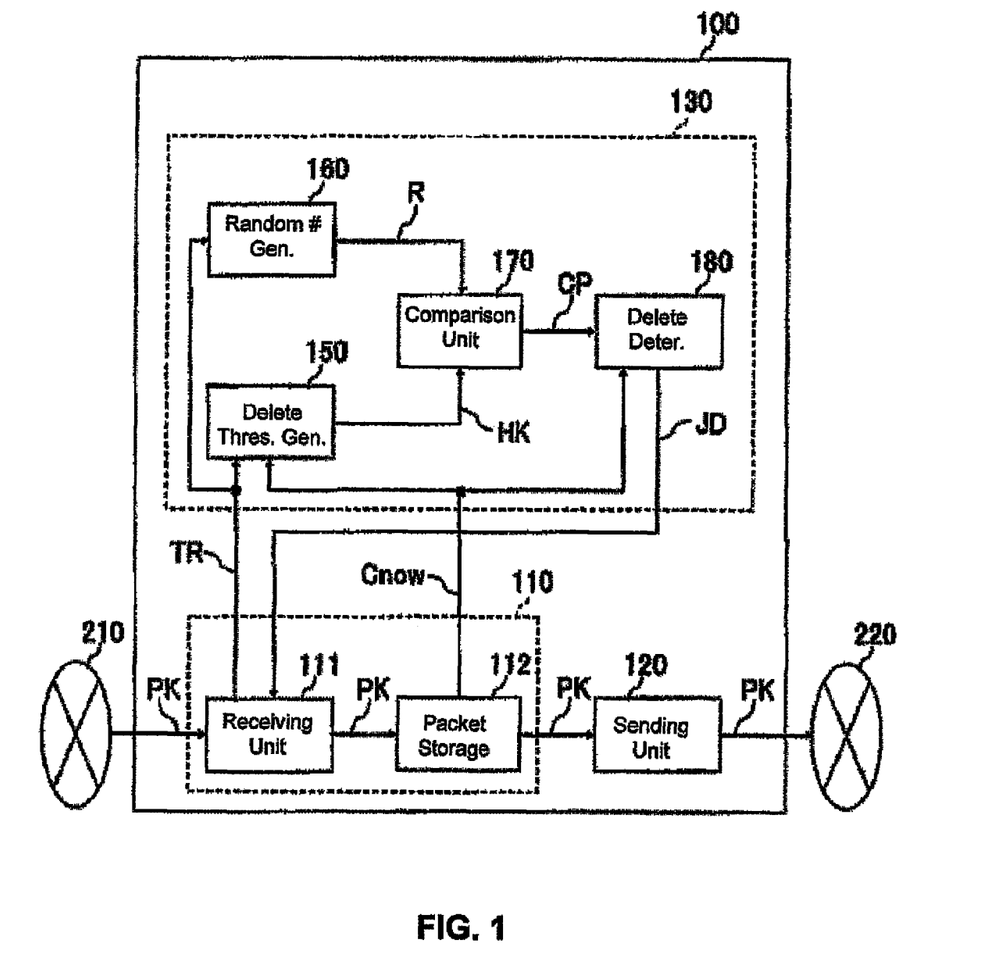
FIG. 1 is a block diagram of a packet relay device according to an embodiment of the present invention.

FIG. 1 is a block diagram of a signal packet relay device 100 according to the present embodiment. In operation, the signal packet relay device 100 receives signal packets from a communication network interface 210, stores the received signal packets in a so-called queue-type memory device (or "memory queue"), and at the same time transmits previously stored signal packets to a communication network interface 220 after extracting the signal packets stored in the queue. The signal packet relay device 100 is, for example, a router device of a communications network such as the internet.

The signal packet relay device 100 of FIG. 1 includes a packet receiving and storing unit 110, a sending unit 120, and a delete determination circuit 130.

The signal packet receiving and storing unit 110 includes a receiving unit 111 and a packet storage unit 112. The receiving unit 111 receives a signal packet PK from the communication network interface 210, and transmits a packet receipt notification signal TR to the delete determination circuit 130. In addition, the receiving unit 111 is responsive to a delete determination result JD (from the delete determination circuit 130) to either delete (or drop) the received signal packet or forward the received signal packet to the signal packet storage unit 112 (memory queue) for storage therein. The signal packet storage unit 112 is a queue-type memory which sequentially stores received packets from the receiving unit 111. In addition, the signal packet storage unit 112 generates a current-packet-count signal Cnow which is indicative of the current number of signal packets stored in the signal packet storage unit 112.

The sending unit 120 sequentially extracts the signal packets stored in the signal packet storage unit 112 and relays the signal packets to the communication network interface 220.

The delete determination circuit 130 includes a delete threshold generation unit 150, a random number generation unit 160, a comparison unit 170, and a delete determination unit 180.

Figure 2:
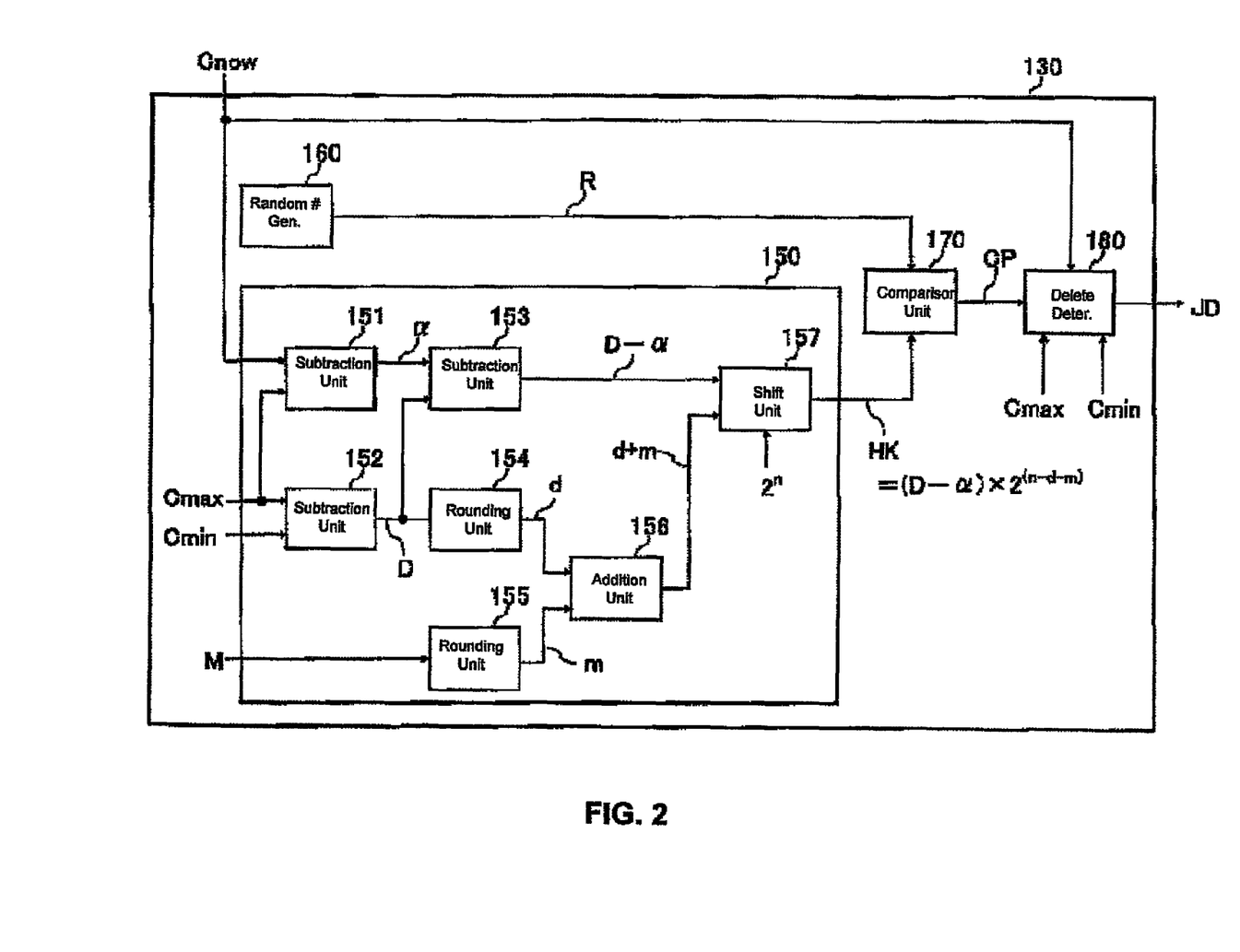
FIG. 2 is a block diagram of a delete determination circuit included in the signal packet relay device of FIG. 1 according to an embodiment of the present invention.

FIG. 2 is a block diagram of the delete determination circuit 130 shown in FIG. 1. In FIG. 2, however, a detailed example of the delete threshold generation unit 150 is shown.

In operation, the delete threshold generation unit 150 is responsive to a received packet receipt notification signal TR (from the receiving unit 111) to generate a delete threshold signal HK based on a computed objective delete probability.

Figure 3:
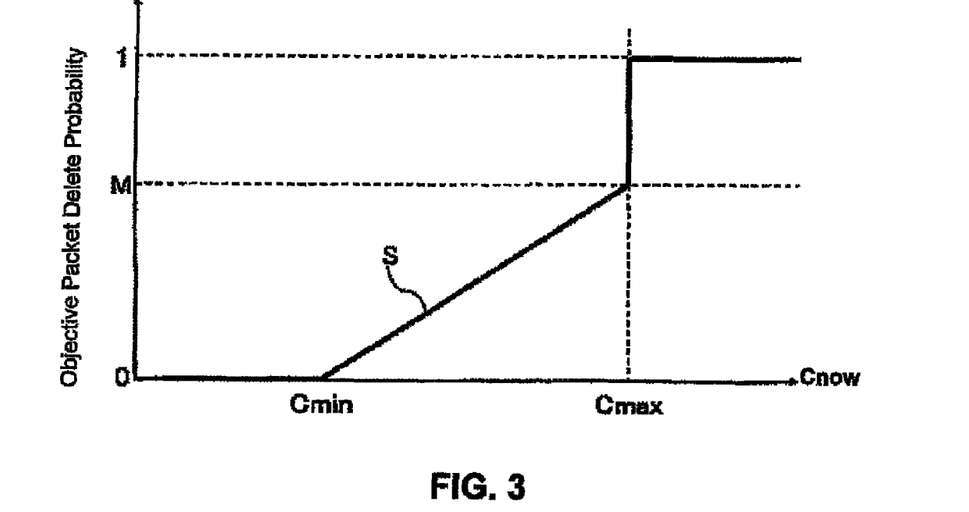
FIG. 3 is a graph depicting a relationship between numbers of currently stored packets and packet delete probabilities according to an embodiment of the present invention.

FIG. 3 is a graph showing relationship between the current-packet-number signal Cnow and the objective delete probability. In the figure, the horizontal axis represents the current-packet-number signal Cnow (indicative of the number of packets currently stored in the signal packet storage unit 112) and the vertical axis of the graph represents the objective packet delete probability. A maximum delete threshold Cmax and a minimum delete threshold Cmin are determined in advance and respectively denote a maximum number of packets and a minimum number of packets stored in the signal packet storage unit 112.

The objective packet delete probability is zero (0%) when the current-packet-number signal Cnow is less than to the minimum delete threshold Cmin, and is one (100%) when the current-packet-number signal Cnow is more than to the maximum delete threshold Cmax. In between the minimum and maximum delete thresholds Cmin and Cmax, the objective packet delete probability varies linearly (at "S" in FIG. 3) between zero and a maximum M. The maximum delete probability M is a predetermined value in the delete threshold generation unit 150. The linear variation of the objective delete probability S may be represented by the following equation:

$$S=(D-\alpha)/(D*M)$$

where "$\alpha$" denotes a maximum side difference equal to Cmax−Cnow, "D" denotes a threshold difference equal to Cmax−Cmin, and M denotes the maximum delete probability described previously. According to the present embodiment, in order to reduce the size and/or complexity of the circuitry required to implement the delete determination circuit 130, the objective delete probability S is represented utilizing rounding values of the threshold difference D and the maximum delete probability M.

In particular, in this exemplary embodiment, the threshold difference D is rounded to the closest power of 2 (i.e., $2^d$) to obtain a rounded threshold difference D'. For example, in the case where D=500, the rounded threshold difference D' is $2^9$ (=512) and d=9. If D=1000, the rounded threshold difference D' would be $2^{10}$ (=1024) and d=10.

Likewise, the maximum delete probability M to the closest power of 2 (i.e., $\frac{1}{2}^m$) to obtain a rounded threshold difference M'. For example, in the case where M=0.100, the rounded threshold difference M' is $\frac{1}{2}^3$ (=0.0125) and m=3.

In this exemplary embodiment, a rounded objective delete probability S' equals $(D-\alpha)/D'*M'$, where $D'=2^d$ and $M'=\frac{1}{2}^m$ as described above.

Assuming a 16-bit uniform random numbers R exists, then a probability fulfilling the following equation (1) is equal to the objective delete probability S':

$$R \leq ((D-\alpha)/2^d)*(1/2^m)*2^{16}. \quad \text{Equation (1)}$$

If the equation (1) is developed, then the following equation (2) is obtained:

$$R \leq (D-\alpha)*2^{(16-d-m)}. \quad \text{Equation 2}$$

The equations (1) and (2) are equations for the case where one of the uniform random numbers is $2^{16}$, and if a total number of the uniform random numbers $N=2^n$, then the equation (3) is obtained:

$$R \leq (D-\alpha)*2^{(n-d-m)}. \quad \text{Equation 3}$$

The delete threshold generation unit 150 generates a delete threshold HK using a value obtained from the right side of the equation (3). The delete threshold HK is represented by the equation (4):

$$HK=(D-\alpha)*2^{(n-d-m)}. \quad \text{Equation (4)}$$

Referring to FIG. 2 again, the delete threshold generation 150 includes subtraction units 151, 152, and 153, rounding units 154, and 155, an addition unit 156, and a shift unit 157.

The subtraction unit 151 receives input signals corresponding to the maximum delete threshold Cmax and the currently stored packet number Cnow, and outputs signal corresponding to a maximum-value-side difference $\alpha$ which is equal to Cmax−Cnow.

The subtraction unit 152 receives input signals corresponding to the maximum delete threshold Cmax and the minimum delete threshold Cmin, and outputs a signal corresponding to the threshold difference D which is equal to Cmax−Cmin.

The subtraction unit 153 receives input signals corresponding to the maximum-value-side difference α. and the threshold difference D, and outputs a (D−α) signal which is equal to D−α.

The rounding unit 154 the signal denoting the threshold difference D, and outputs a signal denoting a power "d" corresponding the rounded threshold difference $D'=2^d$. For example, in the case where D=500, the rounded threshold difference D' is $2^9$ (=512) and d=9. If D=1000, the rounded threshold difference D' would be $2^{10}$ (=1024) and d=10.

The rounding unit 155 receives a signal denoting the maximum delete probability M, and outputs a signal denoting a power "m" corresponding the rounded maximum delete probability $M'=\frac{1}{2}^m$. For example, in the case where M=0.100, the rounded threshold difference M' is $\frac{1}{2}^3$ (=0.0125) and m=3.

The addition unit 156 receives the signals denoting the powers d and m, and outputs a signal corresponding to the sum d+m.

In the shift unit 157, a power "n" is preset as a total number of random numbers N ($=2^n$) of the uniform random numbers R. The shift unit 157 receives the signals denoting D−α and d+m, shifts the preset power "n" by −(d+m) to obtain $2^{(n-d-m)}$, and outputs a signal denoting the delete threshold HK which is equal to the product $(D-\alpha)\cdot 2^{(n-d-m)}$.

Figure 4:
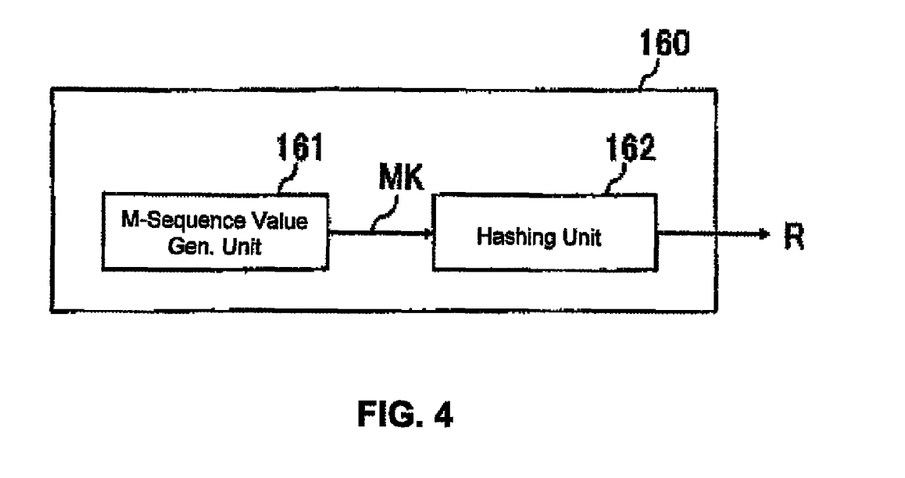
FIG. 4 is a block diagram of a random number generating unit included in the signal packet relay device of FIG. 1 according to an embodiment of the present invention.

The random number generation unit 160 generates one of the uniform random numbers R in response to each signal packet reception notification TR received from the receiving unit 111. FIG. 4 is a block diagram showing an example of the random number generation unit 160. Here, the random number generation unit 160 includes an M-sequence value generation unit 161 and a hashing unit 162.

The M-sequence value generation unit 161 generates M-sequence (Maximum Length Sequence) values MK. In the case where the M-sequence value generation unit 161 is composed by, for example, a 16-bit register, a cycle of the generated M-sequence values MK is $2^{16}-1$. In other words, according to the probability, after the M-sequence value generation unit 161 generates the M-sequence values MK $2^{16}$ times, an M-sequence value MK having the same value is first generated, and then uniform random numbers are generated without circulating within the cycle. In the case where the M-sequence value generation unit 161 is composed by a 16-bit register, the M-sequence values MK are positive integers from 1 to 65535, and the number of the values is 65535 ($=2^{16}-1$).

A hashing unit 162 performs normal hashing on the M-sequence values MK and obtains uniform random numbers R. With hashing, random-numbers exhibiting higher randomness than the M-sequence values MK of pseudo-random numbers can be obtained. In the case where the M-sequence value generation unit 161 is composed by a 16-bit register, the uniform random numbers R are integers range from 1 to 65535, and the number of the values is 65534 ($=16^{th}$ power of 2-1).

The comparison unit 170 receives a signal denoting the uniform random numbers R and a signal denoting the delete threshold HK, and outputs a signal denoting a delete comparison result CP corresponding to the difference between the uniform random numbers R and a signal denoting the delete threshold HK.

Figure 5:
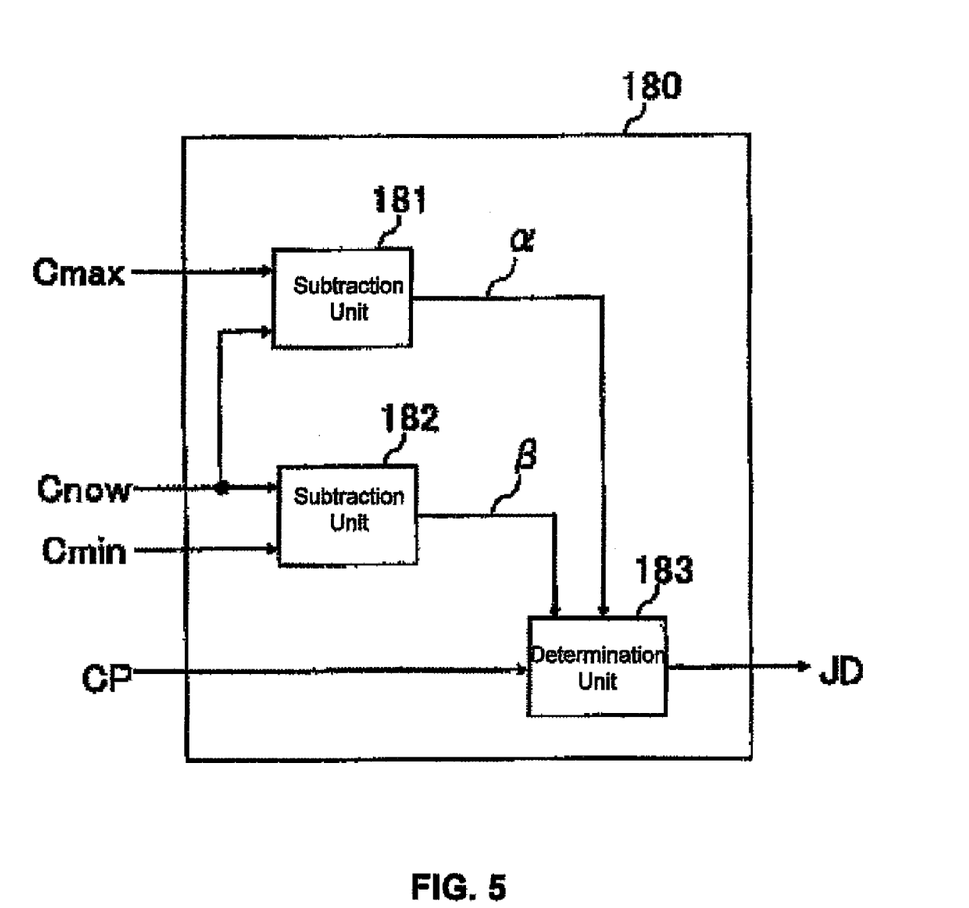
FIG. 5 is a block diagram showing a delete determination unit according to an embodiment of the present invention.

The delete determination unit 180 determinates whether the received packet is to be deleted or stored, based on the delete comparison result CP, and provides the receiving unit 111 with the delete storage determination result JD of the above determination result. FIG. 5 is a block diagram of the delete determination unit 180. The delete determination unit 180 consists of subtraction units 181 and 182, and a determination unit 183.

The subtraction unit 181 receives a signal denoting the maximum delete threshold Cmax and a signal denoting the currently stored packet number Cnow, and outputs as signal denoting the maximum side difference α which corresponds to Cmax−Cnow.

The subtraction unit 182 receives a signal denoting the minimum delete threshold Cmin and a signal denoting the currently stored packet number Cnow a, and outputs a signal denoting the minimum-value-side difference β which corresponds to Cmin−Cnow.

Figure 6:
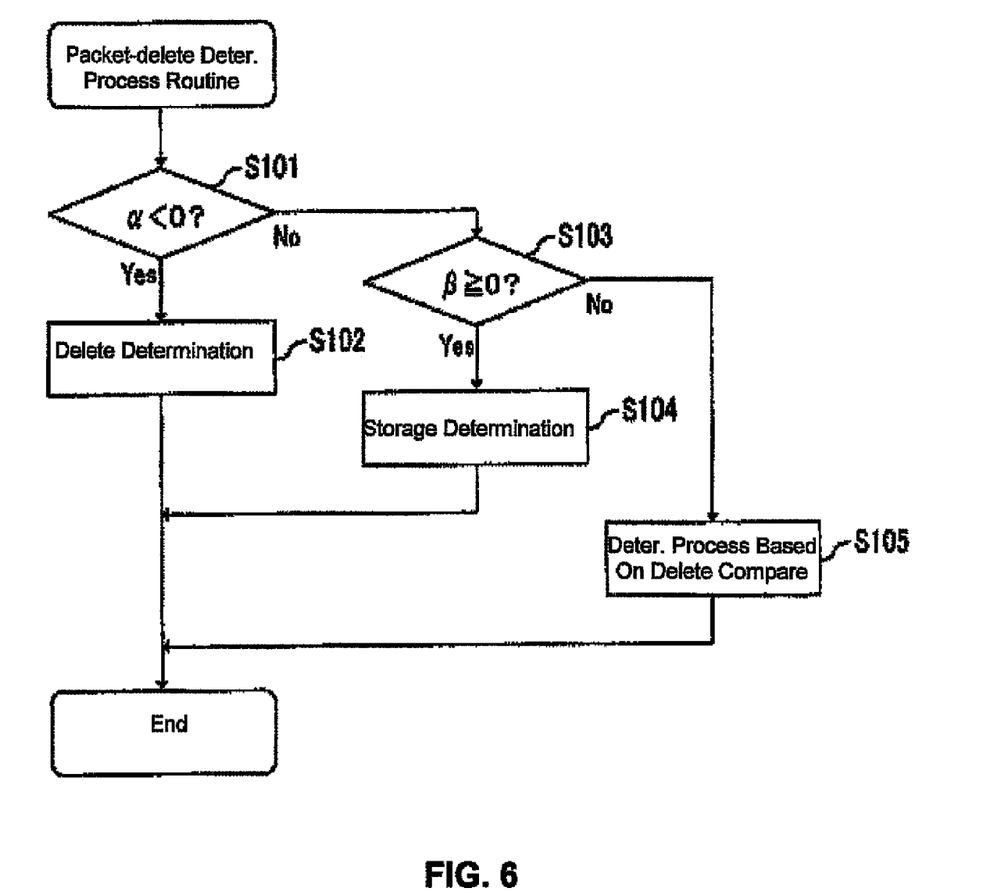
FIG. 6 is a flowchart showing a packet delete determination process routine according to an embodiment of the present invention.

The determination unit 183 determines whether the received packet is to be deleted or stored, based on the maximum-value-side difference α from the subtraction unit 181, the minimum side difference β from the subtraction unit 182, and the delete comparison result CP from the comparison unit 170. FIG. 6 is a flowchart showing a packet delete determination process routine of the determination unit 183. The signal packet delete determination of the determination unit 183 will be explained with reference to FIG. 6.

The determination unit 183 determines first whether the maximum-value-side difference α is smaller than zero, or not (step S101). In the case where the determination unit 183 determines that the maximum-value-side difference α is smaller than zero, in other words, in the case where the currently stored packet number C now surpasses the maximum delete threshold Cmax, the determination unit 183 determines that the received packet is to be deleted (step 102). In the case where the determination unit 183 determines that the maximum side difference α is equal to or larger than zero, in other words, in the case where stored packet number Cnow does not reach to the maximum delete threshold Cmax, the determination unit 183 determines whether the minimum-value-side difference β is equal to or larger than zero, or not (step 103). In the case where the determination unit 183 determines that the minimum-value-side difference β is equal to or larger than zero, in other words, in the case where stored packet number C now does not reach to the minimum delete threshold Cmin, the determination unit 183 determines that the received packet is to be stored (step 104). In the case where the determination unit 183 determines that the minimum-value-side difference β is smaller than zero, in other words, in the case where the currently stored packet number Cnow surpasses the minimum delete threshold Cmin and does not reaches to the maximum-value-side delete threshold Cmax, the determination unit 183 determines whether the received packet is to be deleted or stored, based on the delete comparison result CP (step 105).

Figure 7:
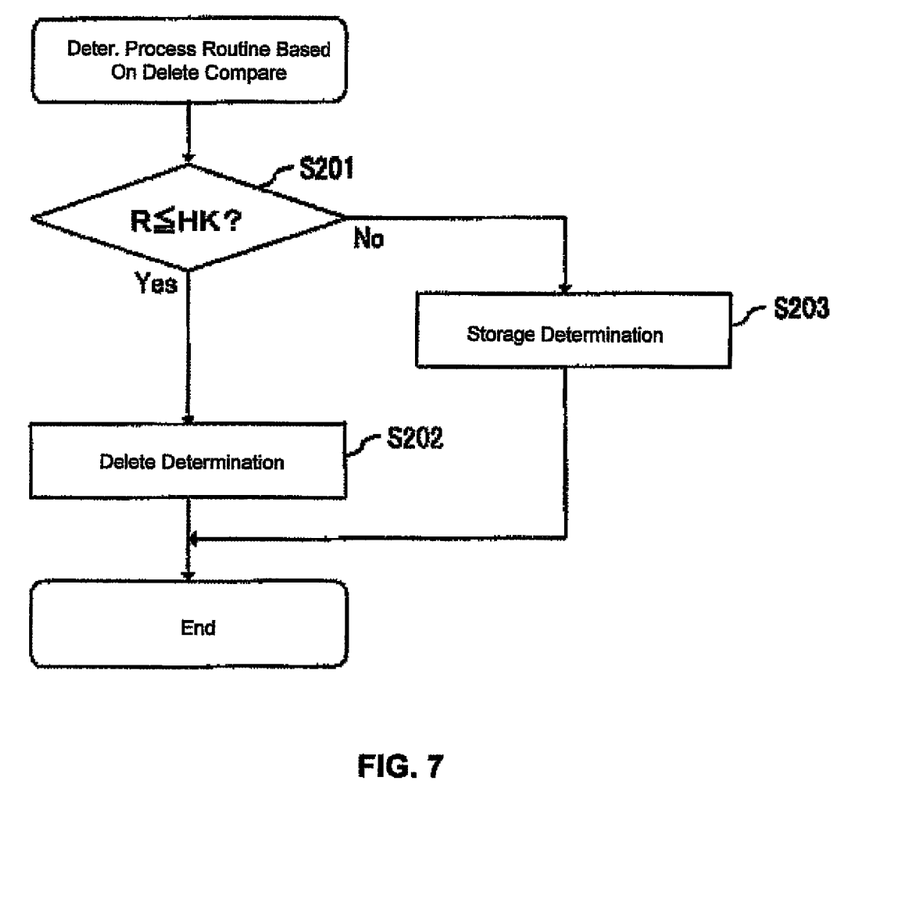
FIG. 7 is a flowchart showing a determination process routine based on the delete comparison result according to an embodiment of the present invention.

FIG. 7 is a flowchart showing a determination process routine based on the delete comparison result. The determination unit 183 determinates whether the delete comparison result CP from the comparison unit 170 indicates that the uniform random numbers R is smaller than the delete threshold HK, or not (step S201). In other words, the determination unit 183 determinates whether the condition represented by the equation (3) is fulfilled, or not. In the case where the uniform random numbers R is equal to or smaller than the comparison threshold HK, the determination unit 183 determines that the received packet is to be deleted (step S202). Meanwhile, the uniform random numbers R is larger than the comparison threshold HK, the determination unit 183 determines that the received packet is to be stored (step S203).

The determination unit 183 provides the receiving unit 111 with a delete-storage determination result JD indicating a result of the aforementioned packet deletes determination process.

Figure 8:
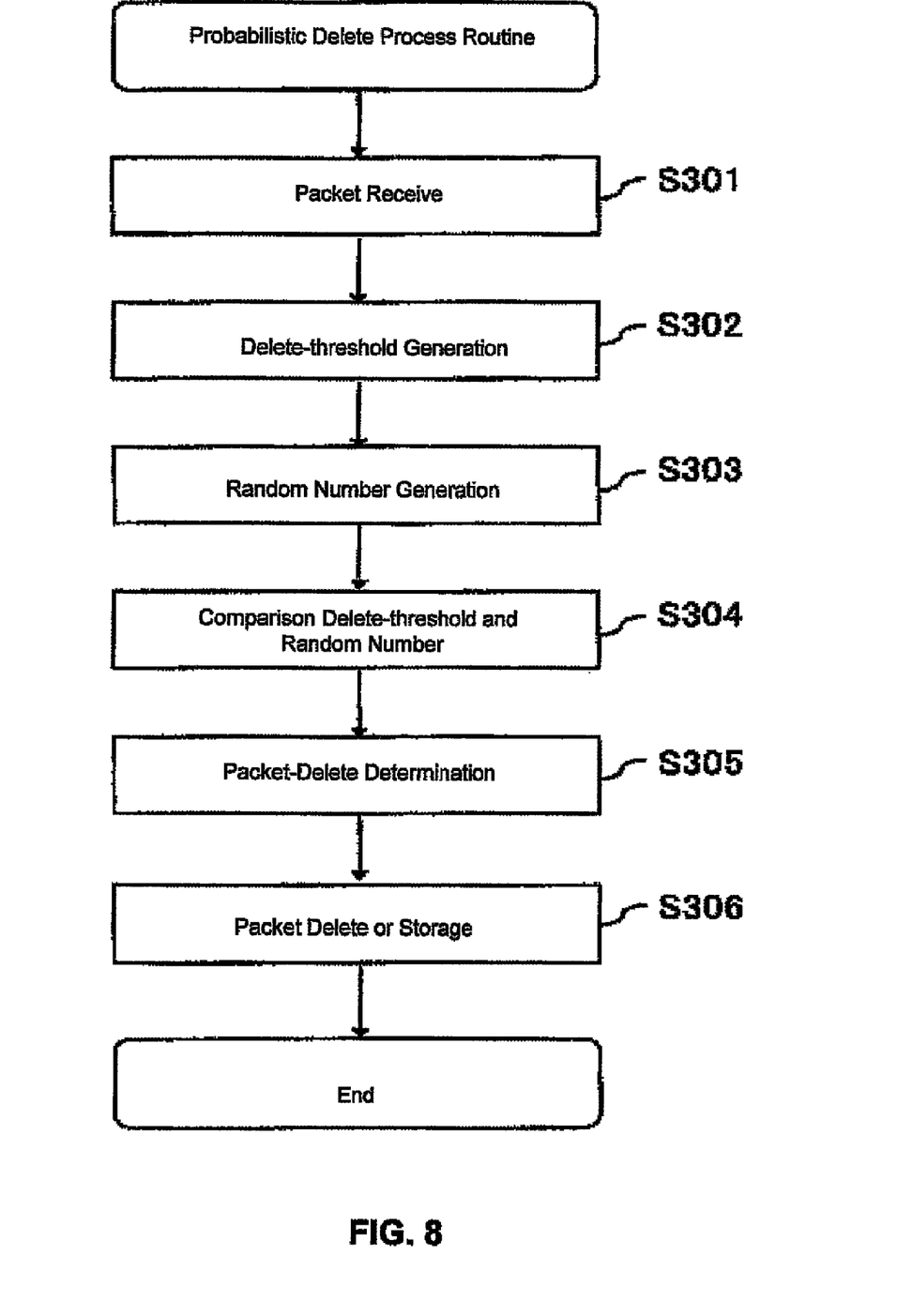
FIG. 8 is a flowchart showing a probabilistic delete process routine according to an embodiment of the present invention.

FIG. 8 is a flowchart showing a probabilistic delete process routine of the signal packet relay device 100. The flowchart of the process routine shows the process performed with respect to each of the signal packets. The probabilistic delete process routine of the signal packet relay device 100 will be explained with reference to FIG. 8, as follows.

In the case where the receiving unit 111 receives the signal packet PK from the communication network 210, the receiving unit 111 provides the delete threshold generation 150 and the random generation unit 160 with the signal packet receipt notification TR (step S301).

The delete threshold generation unit 150 acquires the currently stored packet number Cnow of the signal packet storage unit 112 and generates the delete threshold HK, corresponding to the signal packet receipt notification TR from the receiving unit 111 (step S302). In the above step, the delete threshold generation unit 150 generates the delete threshold HK using a value calculated by the equation (4).

The random generation unit 160 generates the uniform random numbers R corresponding to the signal packet receipt notification TR from the receiving unit 111 (step S303). In the above step, the random generation unit 160 generates the M-sequence values MK having a circulation period of $2^n$, and further generates the uniform random numbers R using values obtained by hashing the M-sequence values MK. The aforementioned process of the step S302 and the above process of the step S303 are performed in parallel.

The comparison unit 170 compares the threshold HK from the delete comparison generation unit 150 and the uniform random number R from the random generation unit 160 (step S304), and provides the delete determination unit 180 with the delete comparison result CP of the above comparison result.

The delete determination unit 180 determinates whether the received packet is to be deleted, or not, based on the delete comparison result CP from the comparison unit 170 (step S305), and provides the receiving unit 111 with the delete storage determination result JD of the above determination result. In the above step, the delete determination unit 180 determinates whether the received packet is to de deleted, or not, according to the determination processes of FIG. 6 and FIG. 7. In the case where the currently stored packet number Cnow is between the maximum delete threshold Cmax and the minimum delete threshold Cmin, the delete determination unit 180 determinates as follows, according to the delete comparison result CP. That is, in the case where the random uniform number is equal to and smaller than the delete threshold HK, the delete determination unit 183 determinates that the received packet is to be deleted. Meanwhile, in the case where the random uniform number is larger than the delete threshold HK, the delete determination unit 183 determinates that the received packet is to be stored. The delete determination unit 183 provides the receiving unit 111 with the delete storage determination result JD showing the result of the signal packet delete determination process.

The receiving unit 111 deletes the received packet, or stores the received packet in the signal packet storage unit 112, according to the delete storage determination result JD from the delete determination unit 180 (step S306).

Figure 9:
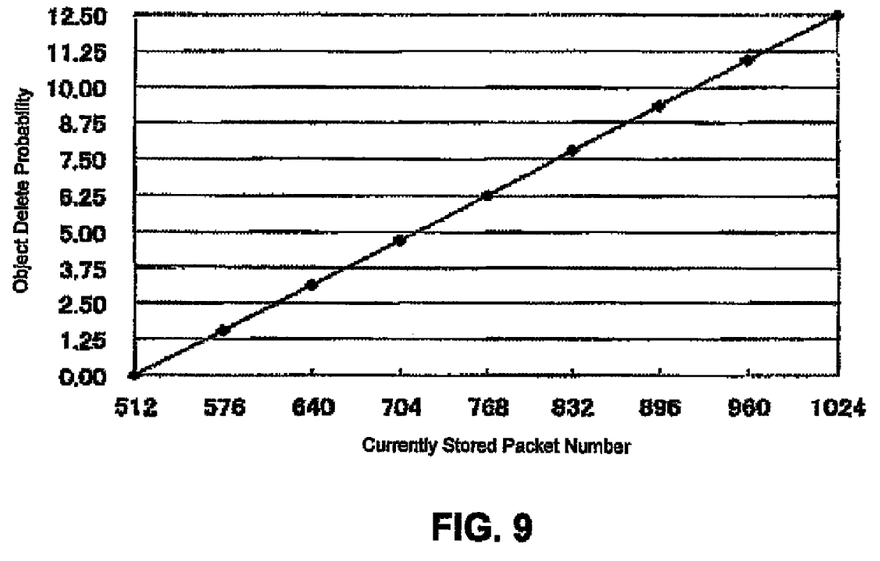
FIG. 9 shows a relationship between numbers of currently stored packets and objective packet delete probabilities according to an embodiment of the present invention.

FIG. 9 is a graph showing a relationship between the currently stored packet number Cnow and the objective delete probability S within the range from the minimum delete threshold Cmin to the maximum delete threshold Cmax, in the case where the maximum delete threshold Cmax=1024 ($2^{10}$), the minimum delete threshold Cmin=512 ($2^9$), and the maximum delete probability M=0.125 (12.5%). The vertical axis of the graph represents the objective delete probability $S=(D-\alpha)/D*M$ in percentage, and the horizontal axis represents the currently stored packet number Cnow. In the case where the currently stored packet number Cnow is equal to the minimum delete threshold Cmin, the objective delete probability S is 0%. In the case where the currently stored packet number Cnow is equal to the maximum delete threshold Cmax, the objective delete probability S is the maximum delete probability M=12.5%. The objective delete probability S increases linearly within the range from the minimum delete threshold Cmin to the maximum delete threshold Cmax.

Figure 10:
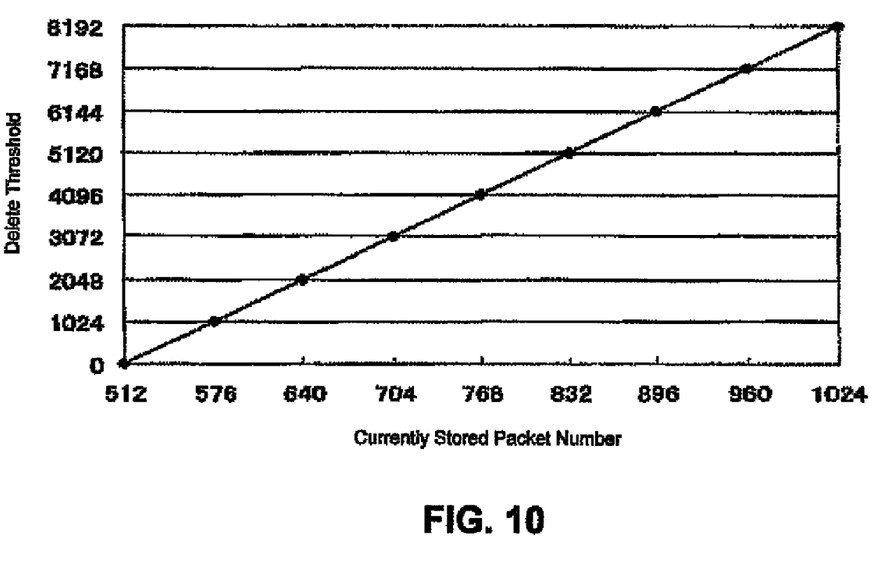
FIG. 10 shows a relationship between numbers of currently stored packets and delete thresholds according to an embodiment of the present invention.

FIG. 10 is a graph showing a relationship between the currently stored packet number Cnow and the delete threshold HK within the range from the minimum delete threshold Cmin to the maximum delete threshold Cmax, in the case where the maximum delete threshold Cmax=1024 ($2^{10}$), the minimum delete threshold Cmin=512 ($2^9$), and the total number of the uniform random numbers N=65536 ($2^{16}$). The vertical axis of the graph represents the delete threshold HK, and the horizontal axis of the graph represents the currently stored packet number Cnow. The threshold HK is represented by the equation (4). In the equation, since the delete difference D=the maximum delete threshold Cmax−the minimum delete threshold Cmin=1024−512=512" ($2^9$), the delete threshold power number of the equation (4) d=9. Also, since the maximum delete threshold M=0.125=1/($2^3$), the delete threshold power number of the equation (4) m=3. In the case where the currently stored packet number Cnow is equal to the maximum delete threshold Cmax, the delete threshold HK is 0. In the case where the currently stored packet number Cnow is equal to the maximum delete threshold Cmax, the delete threshold HK is 8192. The delete threshold HK increases linearly within the range from the minimum delete threshold Cmin to the maximum delete threshold Cmax.

In the case of the above-mentioned condition, the probability that the equation (3) is fulfilled, in other words, the probability that the uniform random numbers R generated by the random generation unit 160 is equal to or smaller than the delete threshold HK generated by the delete threshold generation unit 150 is as follows. For example, in the case where the currently stored packet number Cnow=768, the delete threshold HK=4096, as shown in FIG. 10. The uniform random numbers R are integers from 0 to 65535, and the random numbers having a total number N=65536. The probability that the uniform random numbers R is equal to or smaller than the delete threshold HK=4096 is 4096/65536=6.25%. Also, in the case where the currently stored packet number Cnow=1024, the delete threshold HK=8192, and the probability that the uniform random numbers R is equal to or smaller than the delete threshold HK=8192 is 8192/65536=12.5%.

Figure 11:
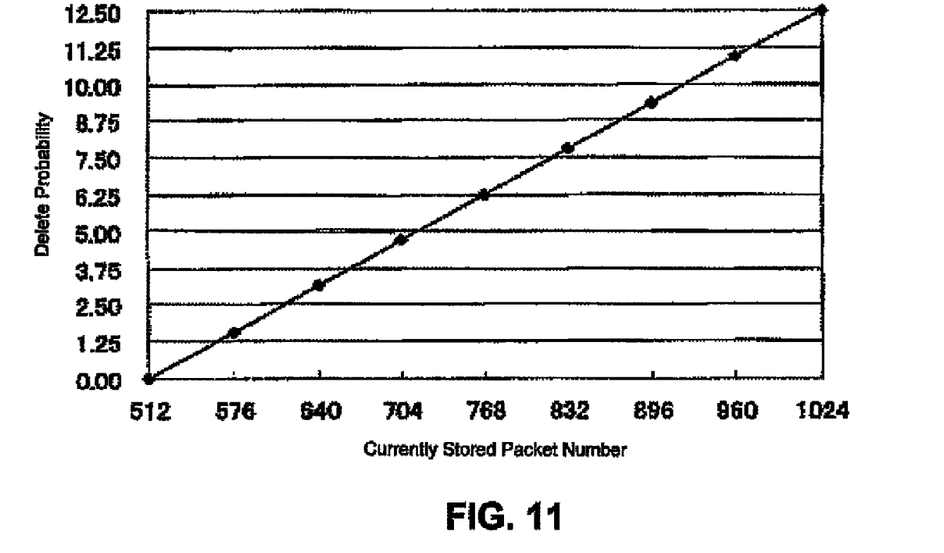
FIG. 11 shows a relationship between numbers of currently stored packets and delete probabilities obtained by the delete determination circuit according to an embodiment of the present invention.

FIG. 11 shows a relationship between the delete probability T, which represents the probability that the equation (3) is fulfilled, in other words, the probability that the uniform random numbers R is equal to or smaller than the delete threshold HK, and the currently stored packet number Cnow. As shown in FIG. 11, the delete probability T is equal to the objective delete probability S shown in FIG. 9, and increases linearly within the range from the minimum delete threshold Cmin to the maximum delete threshold Cmax.

As described before, the signal packet relay device 100 according to the present embodiment generates the uniform random numbers R and the delete threshold HK based on the objective delete probability each time the signal packet relay device 100 receives a signal packet, and the signal packet relay device 100 determines whether the received signal packet is to be deleted or stored based on the comparison result between these values. Consequently, a delete probability which increases linearly within the range from the minimum delete threshold Cmin to the maximum delete threshold Cmax can be obtained. The above delete probability is equal to the objective delete probability S obtained by the WRED method, and thus favorable packet delete characteristics can be obtained. Since the delete threshold generation unit 150 can be realized using a relatively small configuration composed by the addition, subtraction, rounding circuits, and shift circuits, the WRED process can be performed by hardware implementation.

Also, the signal packet relay device 100 according to the present embodiment generates the M-sequence values MK having the cyclic period of $2^n$, and generates the uniform random numbers R by hashing the M-sequence values MK. It becomes possible to decrease the deviations in the delete of the received packet within the cyclic period of the M-sequence values MK by using the uniform random numbers R obtained by the above-mentioned process as the comparison reference.

What is claimed is:

1. A packet-signaling relay device for selectively relaying incoming signal packets, comprising:
    a random number generation unit which generates a random number among a given number of possible random numbers;
    a delete threshold generation unit which generates a delete threshold based on an objective delete probability;
    a comparison unit which compares the random number and the delete threshold to generate a comparison result;
    a delete determination unit which generates a delete/storage determination result based on the comparison result;
    a packet receiving-and-storing unit which is responsive to the delete/storage determination result to selectively delete or store incoming signal packets; and
    a sending unit for sending the signal packets stored in the packet receiving-and-storing unit,
    wherein the delete threshold generation unit generates the delete threshold corresponding to:

$HK=(D-\alpha)*2^{(n-d-m)}$, where HK denotes the delete threshold, where D denotes a difference between a maximum delete threshold and a minimum delete threshold, where $2^d$ denotes a rounded value of D, where α denotes a difference between a number of packets currently stored in the packet receiving-and-storing unit and the maximum delete threshold, where $\frac{1}{2}^m$ denotes a rounded maximum delete probability, and where $2^n$ denotes the given number of possible random numbers.

2. The signal packet relay device of claim 1, wherein the delete comparison unit is a hardwired circuit.

3. The signal packet relay device of claim 2, wherein the random number generation unit includes a M-sequence value generation unit which generates M-sequence values, and a hashing unit for obtaining the random numbers by hashing the M-sequence values.

4. The signal packet rely device of claim 1, wherein the delete comparison unit is a hardwire circuit comprising subtraction, addition, rounding, and shift circuits configured to execute signal processing resulting in the delete threshold HK.

5. The signal packet relay device of claim 4, wherein the random number generation unit includes a M-sequence value generation unit which generates M-sequence values, and a hashing unit for obtaining the random numbers by hashing the M-sequence values.

6. The signal packet relay device of claim 1, wherein the random number generation unit includes a M-sequence value generation unit which generates M-sequence values, and a hashing unit for obtaining the random numbers by hashing the M-sequence values.

7. The signal packet relay device of claim 1, wherein the packet receiving-and-storing unit comprises:
    a storage unit; and
    a receiving unit which receives the incoming packets and the comparison result, and which selectively either deletes the incoming packets or forwards the incoming packets to the storage unit based on the comparison result.

8. The signal packet relay device of claim 7, wherein the objective delete probability corresponds to D−α, where D=Cmax−Cmin, and α=Cmax−Cnow, and
    where Cmax denotes a maximum number of packets stored in the packet storage unit which results in the probability of deleting incoming packets by the receiving unit increasing from a maximum delete probability to a 100% probability;
    where Cmin denotes a minimum number of packets stored in the packet storage unit which results in a 0% probability of deleting incoming packets by the receiving unit; and
    where Cnow denotes a current number of packets stored in the packet storage unit.

9. The signal packet relay device of claim 8, wherein the delete determination unit generates the delete/storage determination result further based on Cmax, Cmin and Cnow.

10. The signal packet rely device of claim 9, wherein the delete comparison unit is a hardwire circuit comprising subtraction, addition, rounding, and shift circuits configured to execute signal processing resulting in the delete threshold HK.

* * * * *